United States Patent
Kitahara et al.

(10) Patent No.: US 7,000,867 B2
(45) Date of Patent: Feb. 21, 2006

(54) LAMINATION APPARATUS

(75) Inventors: Hirotomo Kitahara, Tatsuno (JP); Yasuaki Matsui, Tatsuno (JP); Masaki Koroyasu, Tatsuno (JP); Akira Okuno, Osaka (JP); Katsushige Tsukuya, Osaka (JP); Daimon Ueda, Osaka (JP)

(73) Assignee: Lami Corporation, Inc., Osaka (JP)

( * ) Notice: Subject to any disclaimer, the term of this patent is extended or adjusted under 35 U.S.C. 154(b) by 371 days.

(21) Appl. No.: 10/081,881

(22) Filed: Feb. 22, 2002

(65) Prior Publication Data

US 2002/0170655 A1    Nov. 21, 2002

(30) Foreign Application Priority Data

Mar. 1, 2001    (JP) .............................. 2001-057428

(51) Int. Cl.
*B65H 75/24*    (2006.01)

(52) U.S. Cl. ............... 242/571.4; 242/571.5; 242/571.6; 242/571.7

(58) Field of Classification Search .. 242/571.4–571.7, 242/530.2
See application file for complete search history.

(56) References Cited

U.S. PATENT DOCUMENTS 3,606,187 A * 9/1971 Hahn .................... 242/571.7
3,792,868 A * 2/1974 Flagg ....................... 279/2.01
3,815,836 A * 6/1974 Munnekehoff et al. .. 242/571.7
4,496,114 A * 1/1985 Kataoka .................. 242/571.7
5,279,470 A * 1/1994 Birkmann et al. ........ 242/530.3

FOREIGN PATENT DOCUMENTS

JP    58052132 A    *    3/1983
JP    58157661 A    *    9/1983
JP    61203051 A    *    9/1986

* cited by examiner

*Primary Examiner*—Kathy Matecki
*Assistant Examiner*—Sang Kim
(74) *Attorney, Agent, or Firm*—Dellett and Walters

(57) ABSTRACT

The lamination apparatus of this invention is furnished with a supporting member for a core roll around which films and so forth are wound. The supporting member is durable and can hold firmly the core roll without slip of the core roll for the shaft. The lamination apparatus is to form lamination layers of laminate film pasted on the surface of the printed matters like computer output media, posters, advertising fliers and so forth. The supporting member for a core roll is comprised of a flexible tube 74 like a soft vinyl tube with both ends fixed with fitting 75 in the grooves made on the cylindrical surface of the shaft 71 cut in the axial direction which supports a core roll of laminate film, carrier film and so forth.

3 Claims, 4 Drawing Sheets

LAMINATION APPARATUS

BACKGROUND OF THE INVENTION

1. Field of the Invention

This invention relates to such a lamination apparatus utilized as to form lamination layers of transparent or semitransparent laminate film with adhesive agents on one side of the surfaces pasted on the surfaces of printed posters and advertising fliers, computer output media and so forth (called media hereafter) in order to provide protection to surfaces of printed matters leading to improved water and weather resistance.

2. Prior Art

An original roll of laminate film is composed of a long sheet of lamination layers wound around a core roll (pasteboard roll). Lamination layers are made of transparent or semitransparent film like polyester, vinyl chloride and so forth with adhesive agents applied on one side of the surfaces and detachable paper placed on it.

As shown in the side view of FIG. 5, the conventional lamination apparatus to coat a surface of media with laminate film as above mentioned is furnished with side plates 11 fixed in parallel with each other at the left and right side of the frames as supporting structure for bearings. Those bearings hold a shaft 31 of a carry roller 3, a shaft 41 supporting a core roll of original roll 4 of laminate film A, a shaft 51 supporting a core roll of original roll 5 of carry film C, a shaft 42 for a core roll to rewind sheet of pattern paper B detached from laminate film A, and a shaft of an idler roller 43 respectively.

In addition a table 2 to send media M is accommodated in the space between side plates 11 together with an idler roller 21 the shaft of which is held by bearings.

A carry roller 3 supported by right and left side plates 11 is driven by a motor 30 and a pressure roller 6 is also installed on top of the carry roller 3 to make a pair each other.

The shaft of pressure roller 6 is held by bearings installed in the movable plate 61. One end of the movable plate 61 is supported by the pivot 62 installed in the side plate 11 and the other end is moved up and down by the motion of cam 64 and rod 65 given by the lever 63 in order to keep the pressure roller 6 away from the carry roller 3. The spring 66 gives force to the pressure roller 6 and such force can be adjusted by turn of a screw rod 67 through a handle 68.

The lever 63 be handled by the operator to keep the pressure roller 6 away from the carry roller 3, the original roll 5 of the carry film C is set on the shaft 51 followed by the carry film C passing on the idler roller 21 and the table 2 to be inserted in the space between the carry roller 3 and the pressure roller 6. Then original roll of laminate film A is set on the shaft 41 and a sheet of pattern paper B peeled off laminate film A is rewound around the core roll supported by the shaft 42 through the idler roller 43. On the other hand, laminate film A with adhesive surface exposed is inserted together with a carry film C in the space between the carry roller 3 and the pressure roller 6 followed by the pressure roller 6 being lowered by the operation of lever 63.

With media M placed on the carry film C covering the surface of the table 2 an operator steps on the foot switch to turn a motor 30, the shaft 31 of the carry roller 3 and the shaft 42 of the core roll to rewind the sheet of peeled off pattern paper B. Media M is drawn together with the carry film C in the space between the carry roller 3 and the pressure roller 6 by rotation of the carry roller 3. At that time the laminate film A carried along the surface of the pressure roller 6 and with adhesive surface exposed is pasted on the surface of media M and discharged on a table 8 tilted at the back. On the other hand, the sheet of peeled off pattern paper B is rewound around the core roll supported by the shaft 42.

In operation of the conventional lamination apparatus the brakes are applied to the shaft 41 holding a core roll (pasteboard tube) of an original roll 4 for the laminate film A in order to draw out the laminate film A under tension. In the same way the brakes are applied also to the shaft 51 holding a core roll (pasteboard tube) of original roll 5 for the carry film C. On the other hand, a clutch is fitted to the shaft 42 to drive the core roll (pasteboard tube) for the sheet of pattern paper B that is rewound around it.

If core rolls for respective shafts of 41, 42 and 51 slip on the shafts on the occasion of fitting of those core rolls proper tension specified in advance cannot be achieved by brakes or a clutch. It is feared that the laminate film A and the carry film C may become slack, wrinkled and or specked without proper tension and may lead to bad quality.

Therefore as shown in oblique view of FIG. 6 and cross section of FIG. 7, the shaft 8 is cut at two (2) locations opposite each other on the circumference in order to have flat grooves 81 running the full length of the shaft 8. In each groove 81, a rubber cord 82 slightly thicker than that of groove 81 but slightly shorter than that of groove 81 is fitted with both ends fixed. If the fitted core roll 83 slip, a rubber cord is moved to such narrow corner of the space 84 as made between the inside surface of the core roll 83 and the flat groove 81. Thus slip of the core roll 83 is restrained by torque greater than given by brakes and/or a clutch.

However there are some problems left as far as the rubber cords 82 are concerned since rebound force of the rubber cords 82 given by moving about in the space 84 is weak and the rubber cords 82 are susceptible to deterioration causing slackness and snap that may result in frequent replacement of the rubber cords 82.

SUMMARY OF THE INVENTION

Solutions to such problems as mentioned above are given by this invention. The invented lamination apparatus is concerned with a lamination apparatus to form lamination layers of laminate film pasted on the surfaces of printed matters like posters, advertising fliers, computer output media and so forth. The invented lamination apparatus is furnished with such particular shafts supporting core rolls of rolled films as follows.

1. The shaft is cut on the side surface in the direction of the axis to make a groove in which a flexible tube like a soft vinyl one is accommodated with both ends fixed with fitting. Or 2. The bar is inserted in such tube as mentioned above in 1 with both ends of the bar fixed with fittings.

Symbols herein are defined as follows: A: Laminate films, B: Detachable sheet of pattern paper, C: Carry film, M: Media, 2: Table, 3: Carry roller, 4: Original roll of laminate film, 5: Original roll of carry film, 6: Pressure roller, 7: Supporting member for core roll, 21 and 44: Idler roller, 30: Motor, 71: Shaft, 73: Saucer, 74: Flexible tube, 75: Metal fitting, 79: Core roll.

DESCRIPTION OF THE PREFERRED EMBODIMENTS

Figure 1:
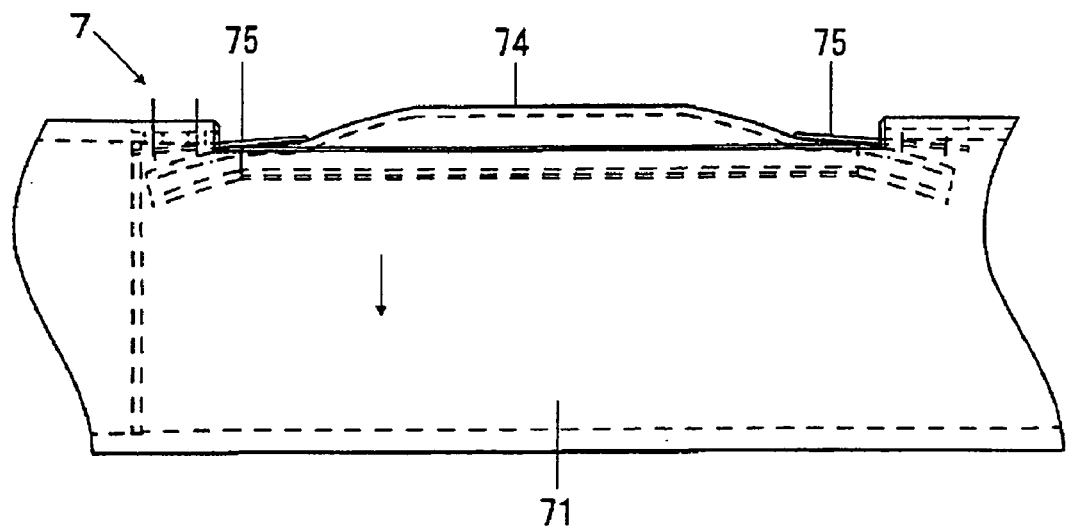
FIG. 1 is side view of the supporting member for a core roll applied to the invented lamination apparatus.
Figure 2:
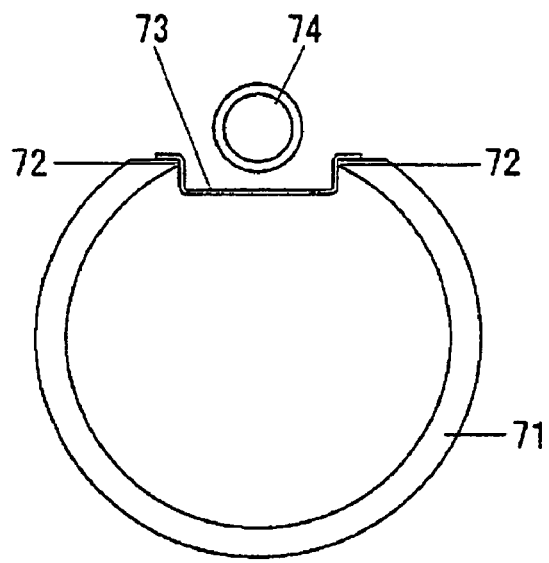
FIG. 2 is cross section of the supporting member for a core roll as shown in the FIG. 1.

The invented lamination apparatus is furnished with such a supporting member 7 for a core roll as shown in side view and cross section of FIG. 1 and FIG. 2 respectively. The tubular shaft 71 to support the core roll is cut for a slit 72 on the side surface in the direction of its axis in which a saucer 73 is accommodated in order to make a groove. In that groove a flexible tube 74 like a soft vinyl tube (e.g. approximate length, diameter and wall thickness are 250 mm, 12~15 mm and 2 mm respectively) is put in the direction of the axis of the groove, and both ends of the tube 74 are fixed by metal fittings 75 fastened with driven screws. Fittings made of synthetic resins can be applied instead of the metal fittings 75.

Figure 3:
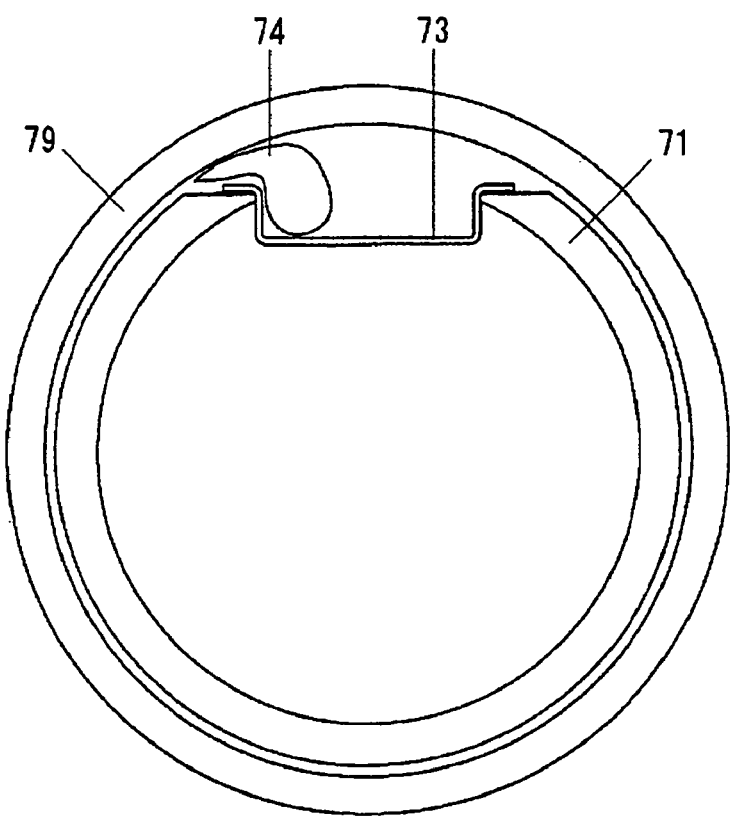
FIG. 3 is cross section showing that a supporting member for a core roll and the core roll are held firmly to each other to refrain from occurrence of slips.

When a core roll is fitted to the supporting member 7, a flexible tube 74 touches the inside surface of the core roll since the flexible tube 74 is swollen in arcs under initial warp. In case of relative rotation of the core roll to the shaft 71 dragging force caused by friction gives deformation to the tube 74 and then the tube 74 moves into the narrow corner of the space between inside of the core roll 79 and the saucer 73 as shown in cross section of FIG. 3. Accordingly the much more torque can be given to the core roll 79 than with brakes or clutches.

Figure 4:
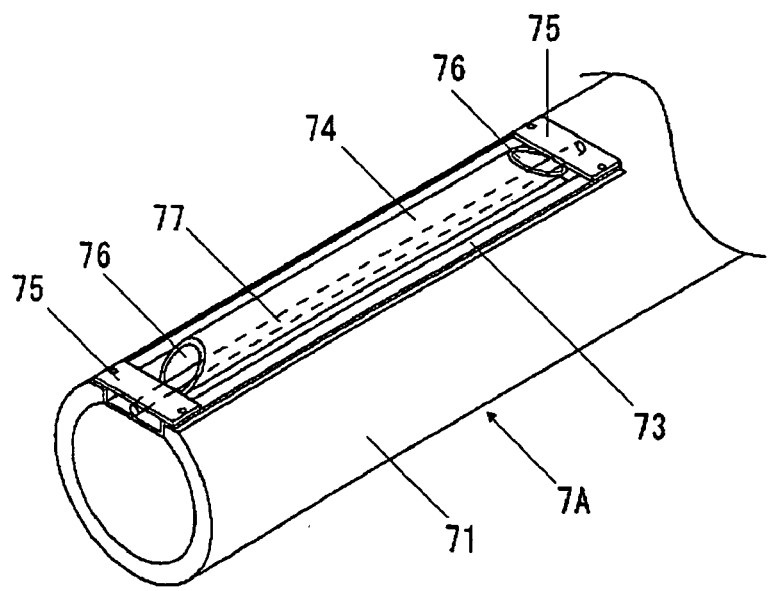
FIG. 4 is oblique view of an alternative practice of supporting member for a core roll.
Figure 5:
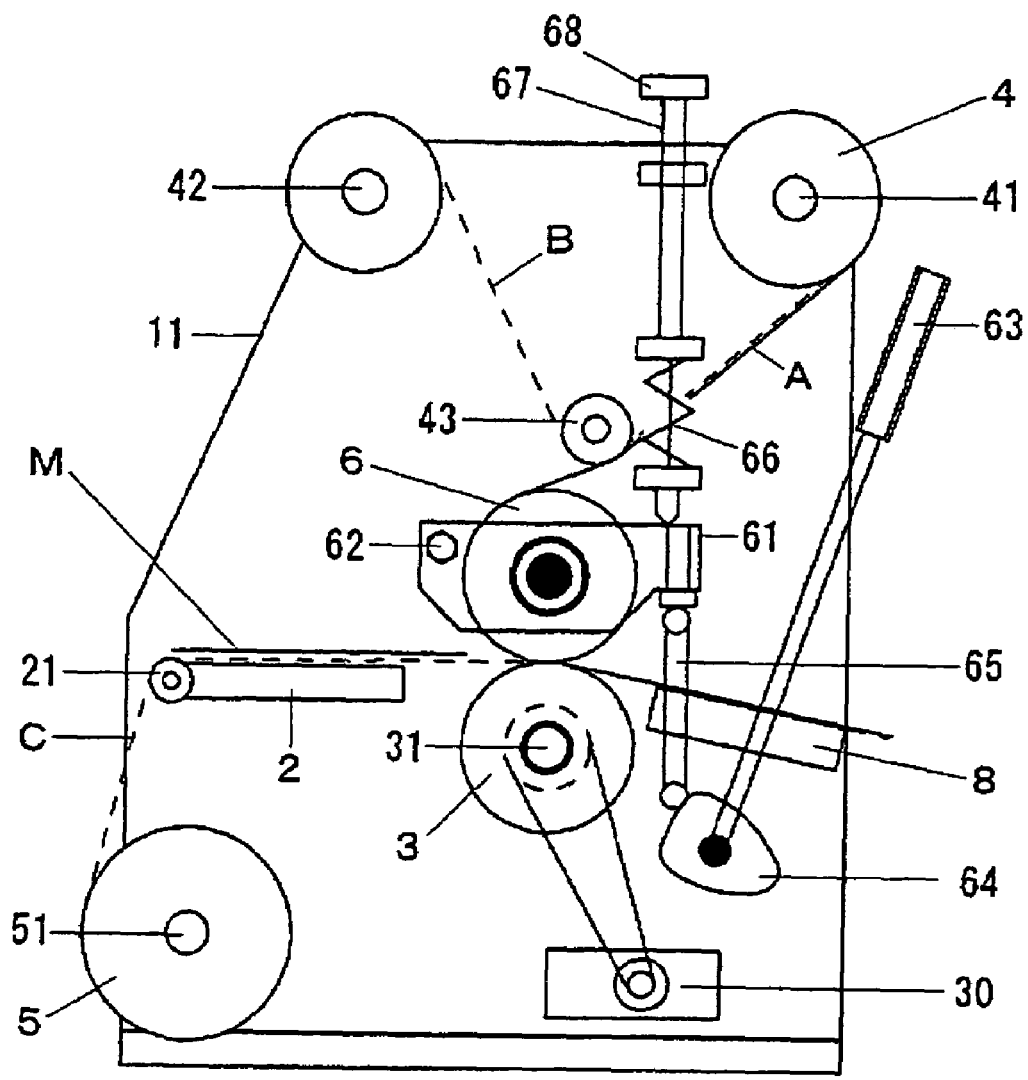
FIG. 5 is cross section showing a conventional lamination apparatus.
Figure 6:
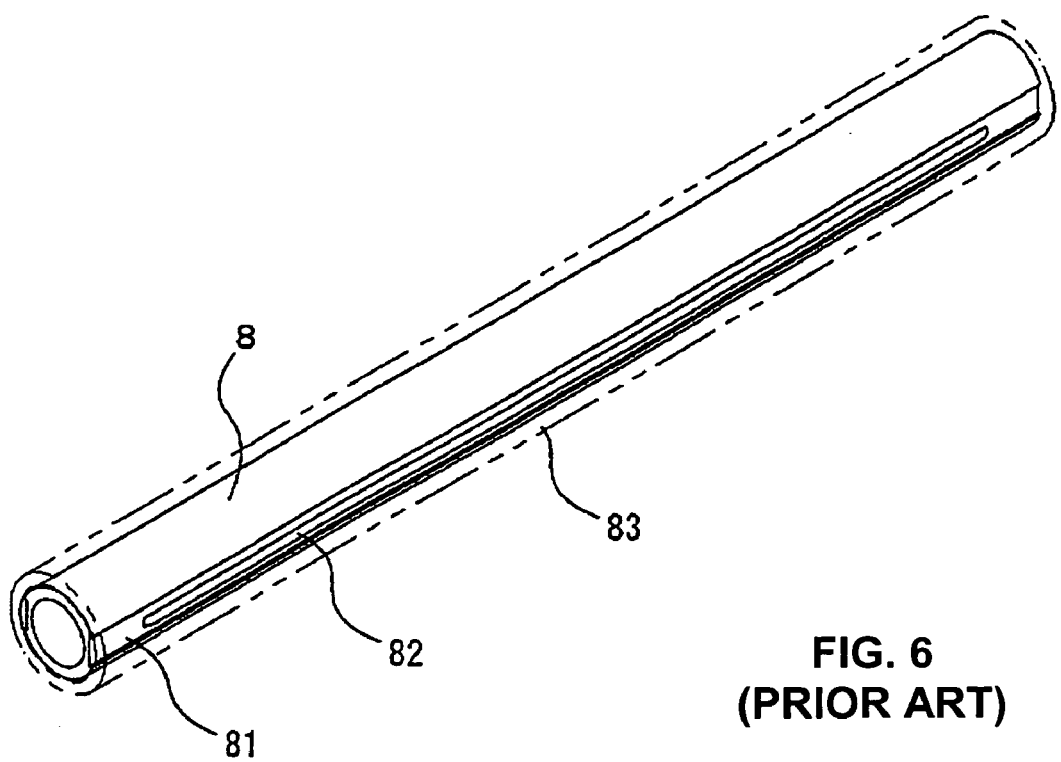
FIG. 6 is oblique view of supporting member for a core roll applied to the conventional lamination apparatus.
Figure 7:
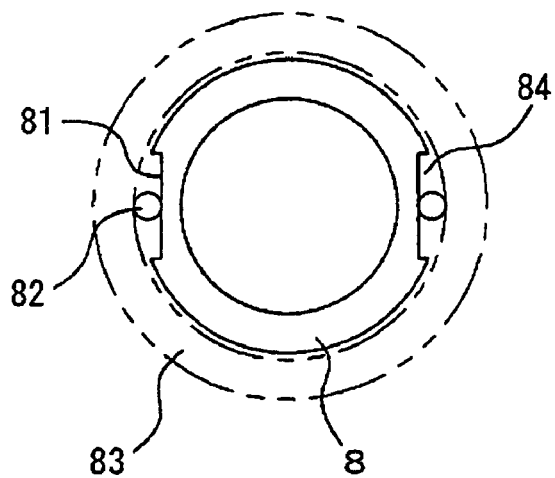
FIG. 7 is cross section of the conventional supporting member fore a core roll.

An alternative practice is as follows as shown in oblique view of FIG. 4. The flexible tube 74 cut at a slant at both ends is put in the saucer 73 in the axial direction in which tube a bar, e.g. a round bar 77, is inserted with the both ends fixed with metal fittings 75.

As far as supporting member 7A for a core roll is concerned, easy fitting of the core roll is possible since the tube 74 is cut at a slant at both ends. When the fitted core roll makes relative rotation to the shaft 71, dragging force caused by friction gives deformation to the tube 74 as shown in cross section of the FIG. 3. Accordingly much more torque can be given to the core roll 79 than with brakes or a clutch.

Although single one of such supporting member 7 or 7A for a core roll will operate the shaft 71, plural ones can be installed on the shaft 71 if shortage of torque is feared.

According to the explanation on form of the practice as mentioned above it is clear that supporting member for the core roll of the invented lamination apparatus can not only resist wear but also gives much more torque to the core roll than with brakes or a clutch due to great friction because a flexible tube like a soft vinyl tube is utilized without use of a rubber cord.

What is claimed is:

1. A lamination apparatus to form lamination layers of laminate film pasted on surfaces of printed matter, containing a shaft to support a core roll with films wound therearound, wherein said shaft has a cylindrical surface and an axial direction, said shaft having a groove on the cylindrical surface along the axial direction where a deformable tube is set with a bar inserted therein, said bar having two ends and both ends of the bar fixed by fittings.

2. The lamination apparatus according to claim 1, wherein said deformable tube is adapted to deform in a direction substantially perpendicular to said axial direction.

3. The lamination apparatus according to claim 1, wherein said printed matter is selected from the group consisting of posters, advertising fliers, and computer output media.

* * * * *